Figure 1:
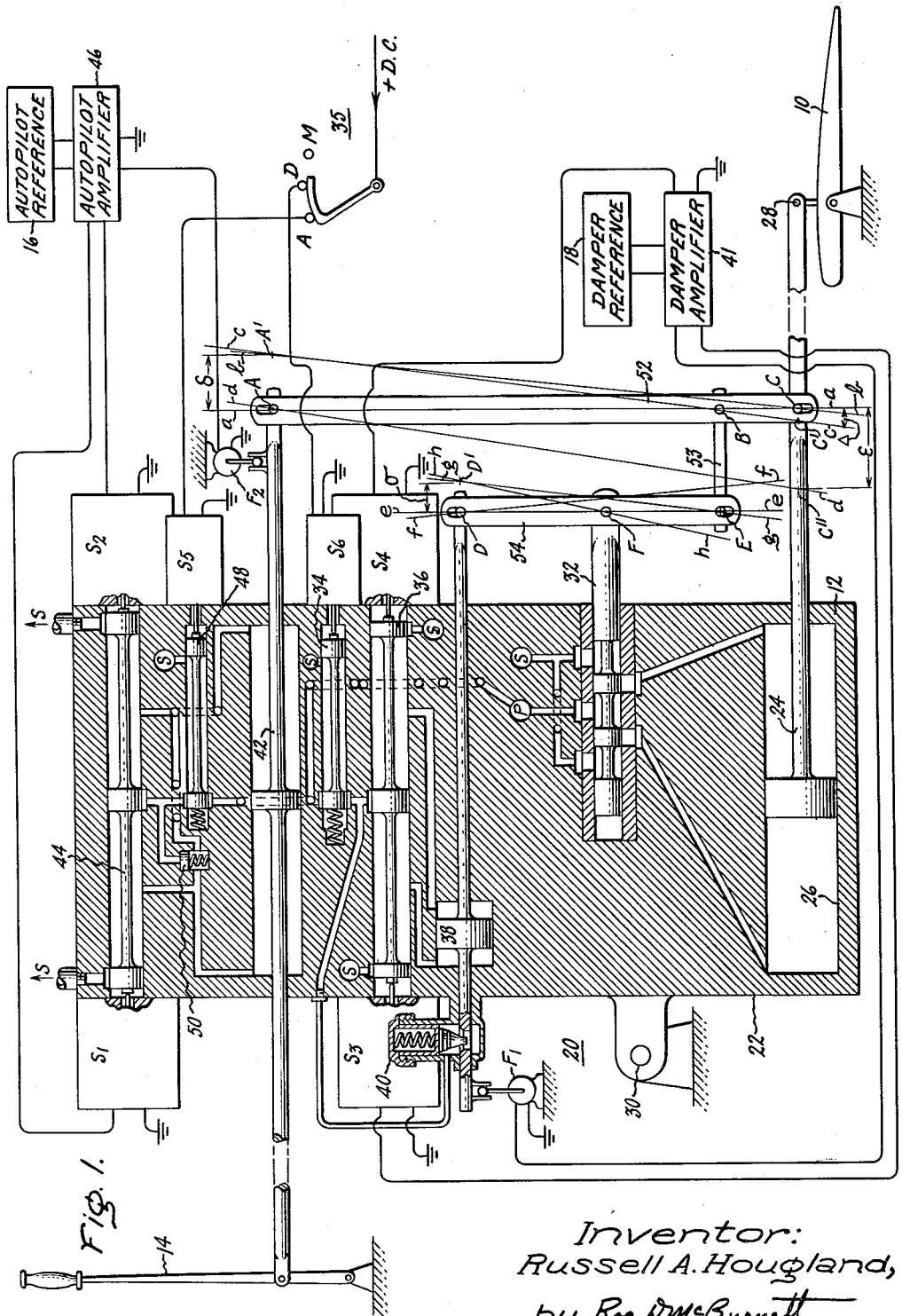

Inventor:
Russell A. Hougland,
by Roe DMcBurnett
His Attorney.

United States Patent Office 2,990,144
Patented June 27, 1961

2,990,144
INTEGRATED HYDRAULIC POWER ACTUATOR
Russell A. Hougland, Scotia, N.Y., assignor to General Electric Company, a corporation of New York
Filed Nov. 5, 1956, Ser. No. 620,245
7 Claims. (Cl. 244—78)

The present invention relates to an integrated hydraulic power actuator and more particularly to an integrated hydraulic power actuator adapted for combined manual and automatic control of the direction of travel or of the attitude of flight of an aircraft vehicle.

In the control of modern high speed dirigible vehicles, such as aircrafts, at speeds approaching and sometimes exceeding the speed of sound, the forces required at the control surfaces of the vehicle frequently exceed those which the pilot is capable of supplying for a sustained period without excessive fatigue. Also, the present trend in transonic and supersonic aircraft design is towards progressively thinner wings and smaller aerodynamic control surfaces in order to achieve aerodynamically efficient high speed vehicle. The trend is resulting in marginal stability under certain flight conditions, such as the phenomena of "Snaking," a directional oscillation, and "Dutch" roll, a combination of lateral and directional oscillation. Therefore, the most important single remedy for this situation is to equip the aircraft with an autopilot which improves the airplane's stability in these critical flight conditions with a minimum increase in drag. In this manner, two important advantages are achieved, whereby the airplane becomes a stable weapons platform under all flight conditions and the airplane's flying characteristics in these critical flight conditions are greatly improved.

Further, the use of an autopilot in a modern high speed aircraft performs a relief in maneuvering function where a multiplicity of tasks stress the ability of the pilot. Hence, to assist the pilot in his task the autopilot is designed to maintain attitude, altitude and/or heading constant and to be able to tie-in with both navigational and fire-control systems. Accordingly, the autopilot performs a maneuvering function which the human pilot may find difficult or even impossible. Thus, it can be seen that the modern autopilot should perform an important damping function as well as a relief and maneuvering function in every phase of the high speed aircraft mission from take-off to landing.

The conventional autopilot or fully-powered flight control system contains a power control actuator which moves the control surface in response to mechanical inputs, and normally has three operational modes, the damping mode, autopilot mode and a fully automatic mode. These mechanical inputs may be manual, such as pilot initiated, or automatic which are initiated by the autopilot and/or the damper systems. Generally, the autopilot signals for changing the aircraft's path are put in through an actuator parallel with the pilot's input so that the control stick will move in conjunction with the autopilot input. The damper signals for damping the aircraft's oscillations are added by another separate actuator in series with the pilot's input so that the control stick will not move in response to damping inputs.

Generally, damping is accomplished about each aircraft axis by automatically displacing the appropriate control surface of the aircraft to oppose undesirable angular rates. When the autopilot is engaged, sensing elements such as conventional vertical gyroscopes and heading gyroscopes are added to the damper mode configuration, so that signals proportional to any deviation from the engaged attitude are developed which enable the autopilot to maintain the attitude established at the time of autopilot engagement. In the fully automatic mode, the flight path is automatically controlled by navigational equipment and the pilot merely monitors the system.

At the present time, a number of schemes for combining the functions of these actuators in one unit have been devised; however these schemes have had one of two major disadvantages. Either the control stick moves in response to damping signals, in fully automatic modes of operation, or the stick will not move in response to any signals, either autopilot or damper signals.

The present invention consists of an integrated hydraulic power actuator for use in aircraft surface control systems wherein an irreversible power control actuator with mechanical feedback, a parallel autopilot actuator, and a series damper actuator are integrated into one compact, lightweight unit. The power control actuator unit is pivotally secured to the airframe of the aircraft while the power piston of the actuator unit is slideable therein to position the control surface of the aircraft, and a linkage arrangement utilized for mechanical feedback. In this manner, a single package assembly offers the possibility for space and weight saving in the total component weight, and more important, an appreciable saving in weight in the required hydraulic plumbing and in the control linkage system.

The reliability of the over-all control system is further increased by the reduction in the number of hydraulic and mechanical connections. Also, it is desirable and quite advantageous to have the damper actuator as close to the power control valve as possible to reduce the static and dynamic forces opposing the damping motion which would otherwise tend to reflect this damping motion back through the control system to the control stick. Further, backlash between the damper actuator and the power control valve can be minimized to improve the performance of the system when operating in the damper mode.

The principal advantages of the present integrated hydraulic power actuator are that the autopilot and damper actuators are independent of each other. In this manner, autopilot inputs are reflected to the control stick where they can be monitored by the pilot while damping inputs are not reflected thereto. Damping signals are generally of small amplitude and relatively high frequency, and if reflected to the stick, they can be quite distracting to the pilot. Further, the pilot's own inertia and reflexes would oppose these damping motions, thus impairing the performance of the damper system. Consequently, since the autopilot actuator is independent of the damper actuator, it may be used, with other components in the system to provide the desired "feel" forces in the control system. Therefore, by application of moderate control stick forces, the pilot can over-power the full authority parallel actuator and maintain full control of the control surface.

An object of the present invention is the provision of an integrated hydraulic power actuator for use in aircraft surface control systems for the control of the direction of travel and/or the attitude of the aircraft.

Another object is to provide an integrated power actuator for use in aircraft surface control systems wherein damping signals are not reflected to the control stick.

A further object of the invention is the provision of an integrated hydraulic power actuator for use in aircraft surface control systems wherein the damping signals are not reflected to the control stick while autopilot signals are transmitted thereto.

A still further object of the present invention is the provision of an integrated hydraulic power actuator for use in aircraft surface control systems wherein the autopilot and damper actuators are independent of each other.

Figure 2:
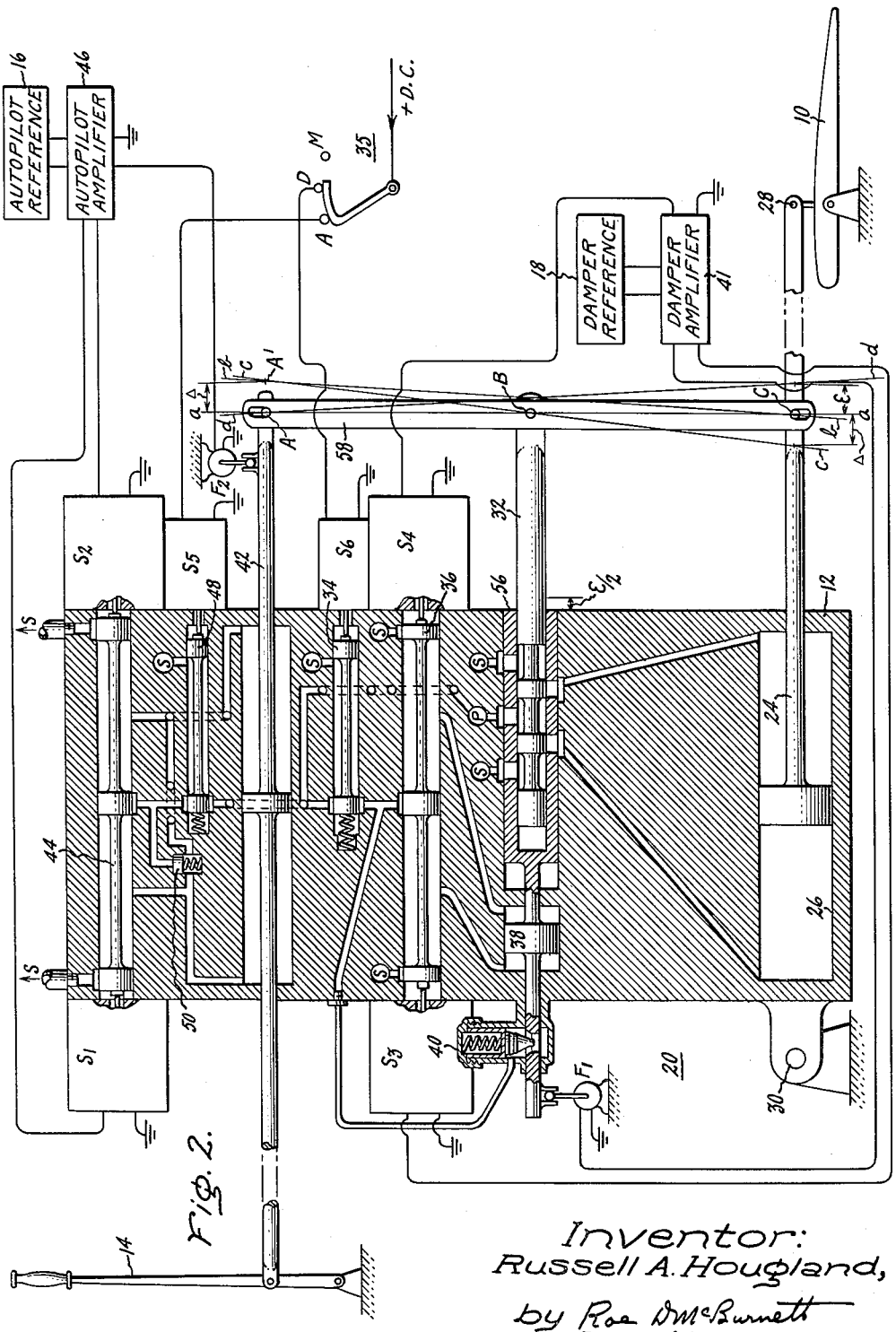

Other objects and many of the other attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a schematic diagram of a preferred embodiment of the invention wherein all the actuator components are combined in a single package, so that the power valve piston and the damper piston are parallel to each other; and FIGURE 2 is a schematic diagram of a modification of the preferred embodiment wherein all the actuator components are combined in a single package, and the damper piston and the power valve piston are operatively coaxial with each other.

Referring now to FIGURE 1 of the drawings, there is illustrated a preferred embodiment with a control surface 10, such as may be positioned by the integrated hydraulic power actuator of this invention, which is connected through suitable linkage for actuation by a power control actuator indicated at 12, in response to manual input signals provided by movement of a manual control stick 14, or in response to automatic flight control signals provided from an autopilot reference 16 and/or a damper reference 18. The manual signals from the control stick 14 and the automatic signals from autopilot reference 16 and damper reference 18 are supplied to the integrated hydraulic power actuator system generally indicated at 20 for the control of the power control actuator 12.

The actuator system 20 consists of a unitary housing 22 having integral therewith the power control actuator 12 which is provided with a power piston 24 slideably coacting with a power control cylinder 26. The power piston 24 is formed with one end thereof extending outside the unitary housing 22 and operatively connected to the control surface 10 through pivot point 28 so as to actuate the surface in response to the movement of the power piston 24. The unitary housing 22 is pivotally secured at 30 to the air-frame of the aircraft to further reduce the space requirement necessary for the installation and operation of the aircraft surface control system 20.

A power valve piston 32 is provided slideably mounted within said housing 22 and formed with a plurality of lands so as to suitably control the flow of fluid under pressure therethrough. Power valve piston 32 is hydraulically coupled through conventional conduits to each end of the power control actuator 12 to control the flow of fluid therein from a conventional high pressure source P.

A shutoff valve 34, operatively provided within the housing 22, is actuated by a solenoid S6 electrically energized through a mode switch 35. The shutoff valve 34 controls the fluid flow from the high pressure source P to a damper control valve 36 which, in turn, controls the flow of fluid to a damper piston 38. The shutoff valve 34 also controls the flow of fluid to a lock mechanism 40, as disclosed and claimed in co-pending application, Serial No. 476,257 filed December 20, 1954 by Horace H. Christensen, now Patent No. 2,819,031 issued January 7, 1957 and assigned to the assignee of the instant application, which serves to lock the damper piston 38 in its null or equilibrium position. The damper control valve 36 is axially actuated in response to opposing solenoids S3 and S4 reacting to electrical signals from the damper reference 18 transmitted through the damper amplifier 41.

An autopilot piston 42 is provided within the housing 22 to slideably coact therewith in response to an autopilot control valve 44, which, in turn, is axially actuated by solenoids S1 and S2 in response to electrical signals from an autopilot amplifier 46 receiving signals from the autopilot reference 16.

A shutoff valve 48, similar in construction and function to the shutoff valve 34, is provided within the housing 22, to control the flow of high pressure fluid from the source P to the autopilot control valve 44 in response to actuation of a solenoid S5 energized through the mode switch 35. A bypass valve 50 is provided between the autopilot control valve 44 and the autopilot piston 42, which, when open, allows fluid to flow freely from one side to the other of autopilot piston 42.

The control stick 14 is pivotally coupled to one end of the autopilot piston 42 extended to axially actuate the piston in response to a manual input. A control lever 52 couples the other end of the autopilot piston 42 with the power piston 24, and with one end of the power valve piston 32 through pivotally coupled linkages 53 and 54. The damper piston 38 is pivotally connected at one end thereof to the link 54 so that the movements of pistons 24, 32, 38, and 42 are correlated. A follow-up mechanism is provided, such as synchro F1 or the like, which is energized by the damper amplifier 41 to close the servo loop between the damper control valve 36, the damper amplifier 41 and the damper piston 38 and their respective solenoids S3 and S4. A second follow-up mechanism, such as synchro F2, is provided electrically energized by the autopilot amplifier 46 to close the servo loop between the autopilot piston 42, the autopilot amplifier 46 and the autopilot control valve 44 and their respective solenoids S1 and S2.

In the operation of the preferred embodiment of FIGURE 1, when the mode switch 35 is set for manual operation and damping is not required, the damper piston is mechanically locked to the housing by the locking mechanism 40. Also, the autopilot piston 42 is freely slideable since the by-pass valve 50 is opened and fluid is free to flow from one side of the piston 42 to the other. Assuming that the pilot puts in an input through the control lever 14, the autopilot piston 42 will be moved to the right an amount ($\delta$).

Link 52 will pivot about point C from position $aa$ to position $bb$ which moves point E to the right. Therefore, link 54 pivots about point D and moves the power valve piston 32 to the right so that link 54 moves from position $ee$ to position $ff$, which is shown slightly exaggerated in FIGURE 1 for purposes of illustration. The power valve piston 32 is moved to the right to port high pressure oil to the right side of the power piston 24 and allows oil to flow out from the left side of the piston. The differential pressure across the piston 24 causes a movement to the left of the piston and the link 52. Thus, link 52 pivots about point A' since the autopilot piston 42 is held fixed by the pilot's forces, the feel system, and friction in the control system. As link 52 moves to the left, it pushes link 54 to the left back to position $ee$ from position $ff$, and the power valve piston 32 is again in a neutral position, and the flow of oil to the power piston 24 is stopped. Power piston 24 stops with pin C moved to the left an amount ($\Delta$), shown as point C'.

When the mode switch 35 is set for autopilot input, the operation is the same as for pilot inputs with the exception that the motion of the autopilot piston 42 is controlled by the autopilot control valve 44, while the autopilot follow-up F2 provides a signal for stabilizing the autopilot servo loop. Hence, since the control stick 14 is rigidly connected to the autopilot piston 42, it will follow all autopilot motions. Incorporated in a conventional manner with the by-pass valve 50 are relief valves, not shown, which enable the pilot to overpower the autopilot piston 42 by the application of a greater than normal force on the control stick.

If the mode switch 35 is set for damper operation, point A in the linkage is essentially fixed with respect to the housing 22, by application of pilot force, feel forces, control friction, and, by the autopilot servo loop, if engaged. Also, the solenoid S6 is energized to actuate shut-off 34 which ports high pressure fluid to the damper control valve 36 and lock 40. The lock 40 restraining the damper piston 38 is disengaged to allow the damper piston 38 to move freely under control of the damper control valve 36 actuated by solenoids S3 and S4. The damper follow-up F1 provides the signal for stabilizing this servo loop. Assuming the damper piston 38 is given a step displacement to the right an amount ($\sigma$), link 54 will pivot about point E from *ee* to *gg*. Fixed point A and momentarily fixed point C prevent link 52 from moving.

Motion of the link 54 causes the power valve piston 32 to move to the right, connecting the right side of the power piston 24 to high-pressure oil and the left side to drain. As the power piston moves to the left, link 52 pivots about point A, moving link 54 to the left. Link 54 pivots about D', moving the power valve piston 32 to the left. When link 54 has rotated from position *gg* to position *hh*, the power valve piston 32 is again in the neutral position and the power piston 24 stops. In the meanwhile, point C has now moved to C", an amount ($\epsilon$) which is proportional to amount ($\sigma$). It is to be noted that point A has not moved in response to damping signals, thus these signals are not reflected to the control stick 14.

For combined damper and autopilot operation, the system 20 adds the autopilot piston 42 output and the damper piston 38 output and positions the power piston 24, accordingly. The closed loop damper system, consisting of the damper piston 38, the damper amplifier 41, the damper control valve 36, the damper follow-up F1, and solenoids S3 and S4, acts to keep pin D rigidly fixed for autopilot piston 42 inputs. Similarly, the autopilot closed loop system acts to keep pin A fixed for damper piston 38 inputs.

The present invention is adapted to single or integral dual power actuators. Also, it is obvious that there can be an infinite number of linkage ratios which will be a function of the practical limits on forces, travels, and bearing play for a particular installation. Thus, the force output and travel of the power piston 24 is determined by the particular aircraft installation. Further, in the event of damper malfunction, the damper piston 38 will be locked in the neutral position by the locking mechanism 40. Also, since the damper actuator, the damper piston 38 and associated damper components, are independent of the rest of the control system 20, friction of this actuator is not reflected in the pilot's control stick 14.

FIGURE 2 illustrates a modification of the preferred embodiment of FIGURE 1, wherein the structural arrangement is substantially the same as in the preferred embodiment with the exception that the power valve piston 32 is coaxially operative with the damper piston 38 through a slideable sleeve member 56. The sleeve member 56 is formed as an integral extension to the damper piston and slideable between the ports and the power valve piston 32 so that any movement of the damping piston 32 will be reflected in an opening or closing of the ports coacting with the power valve piston. In this manner, the linkage requirement for the integrated hydraulic power actuator 20 is reduced and the operation is somewhat simplified. The linkage consists of a control lever 58 operatively connecting the extended ends of autopilot piston, damper piston, and power piston 24, at pivot points A, B, and C, respectively. The remaining structural elements are substantially similar in structure and function to the preferred embodiment, and any differences existing between the preferred embodiment and the modification thereof will be evident in the operation, as hereinafter stated.

In the operation of the modification of the preferred embodiment for straight manual control, the lock on the damper piston 38 is engaged to fix the power valve sleeve 56 to the housing 22. The autopilot by-pass valve 50 is open, and allows the autopilot piston 42 to move without hydraulic restraint. With no input signals and with the power piston 24 in the neutral position, the linkage 58 pivotally connects the extended ends of the autopilot piston 42 and power valve piston 32 with the power piston 24 at point C. Thus, with the power piston in its neutral position, the center line of the link 58 is as shown by line *aa*. If the pilot puts in a step input ($\Delta$), the link 58 will pivot about pin C, and take up a new position shown as line *bb*. This displaces the power valve 32 to the right allowing high-pressure oil to flow to the right of the power piston 24. As the power piston moves to the left, the link 58 pivots about the point A'. When the piston 24 has moved an amount ($\Delta$), the link 58 is in the position shown by line *cc*, in FIGURE 2, and the power valve piston 32 is recentered and stops the flow of oil to the power piston 24. Thus, a one-to-one mechanical feedback exists between the control stick input and the control surface output if AB and BC in lever 58 are equal, as shown in FIGURE 2.

Operation for autopilot input is identical to that for manual control, except that the autopilot piston 42 and point A are positioned in accordance with commands inserted through the autopilot control valve 44 instead of from the control stick 14. Accordingly, the control stick will move in direct correspondence with the autopilot piston. When the damper lock 40 is disengaged, damping signals can be fed into the damper piston 38 through the damper control valve 36. Motion of the damper piston 38 moves the power valve sleeve 56 in proportion therewith.

Assuming a step displacement ($\epsilon/2$) is given the sleeve 56 to the right, the sleeve will port high pressure oil to the left side of the power piston 24 to move the power piston 24 to the right. Due to friction and other forces in the control system 20, the point A will remain fixed relative to the housing 22. Thus, the link 58 will rotate about A and drag the power valve piston 32 to the right. When the power piston 24 has moved to the right an amount ($\epsilon$), the power valve piston 32 will have moved over an amount ($\epsilon/2$). Since this is the same displacement given the damper piston valve sleeve 56, the power valve piston 32 is thus recentered with respect to the sleeve 56, and the flow of oil to the power piston 24 is stopped. Accordingly, the introduction of the damping signals in the system 20 has not introduced motion of point A and hence no motion is reflected to the control stick 14.

For combined operations, the system 20 algebraically adds the manual or autopilot command and the damper command and positions the power piston 24 accordingly. It is obvious that various configurations of the integrated hydraulic power actuator are possible. As indicated by the preferred embodiment of FIGURE 1, a method of inserting the desired damping through a differential linkage, instead of moving the power valve sleeve 56, is feasible. In brief, the operation of the modification is substantially similar to that of the preferred embodiment of FIGURE 1. Further, the linkage configuration can be varied to change the feedback ratios, and the autopilot piston 42 can be linked differentially to the control stick 14 to reduce the required travel for the autopilot piston 42.

Hence the present invention discloses an integrated hydraulic power actuator wherein the desired autopilot motions are reflected to the stick but the undesired damper motions are not, and wherein the autopilot piston 42 can be used to provide the proper "feel" in the control system, irrespective of damper operation. The fixed housing type of integrated hydraulic power actuator utilizes a linkage system to provide the mechanical feedback from the control surface 10. Also, the present invention can be built in two distinct packages, control and power, so that by changing the leverage ratios and the porting in the power valve 32, it is possible to accommodate by a relatively small number of control packages, a wide variety of power cylinders for various applications.

It should be understood, of course, that the foregoing disclosure relates to only a preferred embodiment of the invention and that it is intended to cover all changes and modifications of the example of the invention herein chosen for the purpose of the disclosure, which do not constitute departures from the spirit and scope of the invention as set forth in the appended claims.

What is claimed is:

1. Combined manual and automatic hydraulic control system for positioning an aircraft's control surface in any of several modes including manual, damper, autopilot, and combined damper and autopilot comprising a unitary housing pivotally mounted to the aircraft, an autopilot piston slideably mounted within said housing, an autopilot control valve hydraulically coupled to said autopilot piston for controlling the flow of fluid therethrough, first electrical responsive means biasing said autopilot control valve for controlling the displacement thereof, autopilot reference signalling means electrically coupled to said electrically responsive means, a damper piston slideably mounted within said housing, a damper control valve hydraulically coupled to said damper piston, second electrical responsive means biasing said damper control valve for controlling the displacement thereof, damper reference signal means electrically coupled to said second electrical responsive means, power valve means slideably mounted within said housing, a power control actuator integral with said housing and having a power piston slideably coacting therewith in response to hydraulic signals from said power valve means, said power piston coupled to the control surface for relative movement therebetween, linkage means coupling said autopilot and damper pistons and power valve means to said power piston for actuating the control surface in response to said damping and autopilot reference signals means, a control stick rigidly connected to said autopilot piston for manually displacing said power valve means to vary displacement of the power piston and control surface relative to said housing.

2. A combined manual and automatic hydraulic control system for positioning an aircraft's control surface comprising a hydraulic power actuator unit having a power piston with one end thereof connected to the control surface, a power valve integral with siad actuator unit and hydraulically coupled to said power piston to control upon adjustment away from a neutral position the movement of said piston, control linkage pivotally coupled to one end of said power valve to control the displacement thereof, a manual control stick pivotally coupled to said linkage, a damper piston slideably mounted within said actuator unit and pivotally coupled to said linkage, a damper control valve including a first pair of electrical solenoids for the positioning thereof within said actuator unit to control the flow of fluid to said damper piston, a first automatic electrical control apparatus for energizing said first pair of solenoids in response to a damper reference signal, an autopilot piston slideably mounted within said actuator unit and pivotally coupled at one end to said control linkage and at the other end rigidly connected to said control stick, an autopilot control valve including a second pair of electrical solenoids for the positioning thereof within said actuator unit to control the flow of fluid to said autopilot piston, a second automatic electrical control apparatus for energizing said second pair of solenoids in response to autopilot reference signals, and follow-up means coupled to said damper and autopilot pistons and to said power valve for selectively synchronizing the movements thereof with said damping and autopilot reference signals.

3. An integrated hydraulic power actuator for combined manual and automatic control of an aircraft control surface comprising a power control actuator having a slideable piston with one end thereof pivotally coupled to the control surface, damping means operatively actuating said power control actuator to oppose any undesirable angular rates about an axis of the aircraft, autopilot means actuating said power control actuator in response to signals proportional to deviations from a predetermined aircraft attitude, and unitary housing means operatively containing said damping and autopilot means, a control stick for manual displacement of said control surface, means connecting said stick and said autopilot means in force transmitting relation, and means connecting said damping means to said control surface to provide movement independent of said stick.

4. An integrated hydraulic power actuator for positioning an aircraft control surface comprising a power control actuator, an autopilot actuator and a damper actuator combined with said power control actuator into a unitary unit mounted in the aircraft, external linkage means operatively coupling said actuators with a pivoted manual control stick, said power control actuator having a slideable piston with one end thereof pivotally coupled to the control surface for movement thereof in response to selective signal inputs from said autopilot and damper actuators and said manual control stick, said linkage operatively associated with a mechanical feedback coupled to said piston for predeterminedly neutralizing movement of said power control actuator.

5. The invention as defined in claim 4 but further characterized by said external linkage means comprising a control lever connecting said autopilot actuator and said piston, a power valve piston coaxial with and selectively operative with said damper actuator for controlling the flow of fluid to said power control actuator in response to the selective signal inputs, and said control lever operatively connecting said power valve piston and said piston along the axis of said lever.

6. The invention as defined in claim 4 but further characterized by said external linkage means comprising a control lever pivotally connecting said autopilot actuator and said piston, a power valve piston in parallel relationship with said damper actuator and controlling the flow of fluid to said power control actuator in response to the selective signal inputs, a second control lever pivotally connecting one end of said damper actuator with one end of said power valve piston, and lever means pivotally connecting said first control lever and second control lever to provide a predetermined linkage ratio between the selective signal inputs and the displacement of the control surface.

7. An integrated hydraulic power actuator for positioning an aircraft control surface and enabling the pilot to feel through the manual control stick control surface movement in response to autopilot control and in response to manual control while preventing disturbance of the control stick because of damper inputs to the control surface, said integrated hydraulic power actuator comprising a power control actuator, an autopilot actuator, a damper actuator, means for combining the outputs of said autopilot actuator and said damper actuator to control said power control actuator, a manual control stick coupled to said combining means in force transmitting relation only by said autopilot actuator, the relationship between said autopilot actuator, said damper actuator and said control stick being such that the stick does not move in response to movement of said damper actuator.

References Cited in the file of this patent

UNITED STATES PATENTS

| 2,678,177 | Chenery et al. | May 11, 1954 |
| 2,739,771 | Meredith | Mar. 27, 1956 |
| 2,819,031 | Christensen | Jan. 7, 1958 |
| 2,826,896 | Glaze et al. | Mar. 18, 1958 |
| 2,859,926 | Westbury | Nov. 11, 1958 |